United States Patent
Saha (10) Patent No.: US 7,020,671 B1
(45) Date of Patent: Mar. 28, 2006

(54) IMPLEMENTATION OF AN INVERSE DISCRETE COSINE TRANSFORM USING SINGLE INSTRUCTION MULTIPLE DATA INSTRUCTIONS

(75) Inventor: Arindam Saha, Sunnyvale, CA (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/531,607

(22) Filed: Mar. 21, 2000

(51) Int. Cl.
*G06F 17/14* (2006.01)

(52) U.S. Cl. .................................... 708/402; 708/401

(58) Field of Classification Search ............... 708/402, 708/401
See application file for complete search history.

(56) References Cited

U.S. PATENT DOCUMENTS

| | | | | |
|---|---|---|---|---|
| 5,802,213 A | * | 9/1998 | Gardos | 382/251 |
| 5,964,824 A | * | 10/1999 | Murata et al. | 708/402 |
| 6,009,207 A | * | 12/1999 | Chen | 382/251 |
| 6,026,190 A | * | 2/2000 | Astle | 382/232 |

OTHER PUBLICATIONS

"IEEE Standard Specifications for the Implementation of 8x8 Inverse Discrete Cosine Transform", Mar. 18, 1991, IEEE Circuits and Systems Society, 14 pages, Std. 1180-1990 ISBN 1-55937-098-X.

"A Fast Computational Algorithm for the Discrete Cosine Transform", Wen-Hsiung Chen, C. Harrison Smith, S.C. Fralick, Jan. 24, 1997, 7 pages, IEEE Transactions on Communications, vol. Com-25, No. 9, Sep. 1977.

"Discrete Cosine Transform", N. Ahmed, T. Natarajan, K.R. Rao, 5 pages, Jan. 29, 1973, IEEE Transactions on Computers, Jan. 1974.

* cited by examiner

*Primary Examiner*—Tan V. Mai
(74) *Attorney, Agent, or Firm*—Dorsey & Whitney LLP (57) ABSTRACT

Compressed data are decompressed using an inverse discrete cosine transform (IDCT). A first one directional (1D) IDCT is performed resulting in a plurality of first 1D IDCT coefficients followed by a second 1D IDCT resulting in a plurality of second 1D IDCT coefficients. In performing the first 1D IDCT and the second 1D IDCT a first plurality of intermediate butterfly computations are performed which include performing a plurality of intermediate multiplications resulting in a plurality of initial products and performing a plurality of intermediate additions resulting in intermediate product which are maintained at no more than 16-bits utilizing a round near positive (RNP) rounding scheme. Following the second 1D IDCT a rounding and shifting of the plurality of second 1D IDCT coefficients is performed utilizing a round away from zero (RAZ) rounding scheme resulting in a plurality of output coefficients which comply with the IEEE 1180 standard.

39 Claims, 6 Drawing Sheets

IMPLEMENTATION OF AN INVERSE DISCRETE COSINE TRANSFORM USING SINGLE INSTRUCTION MULTIPLE DATA INSTRUCTIONS

The present invention relates generally to compression and decompression of data signals. In particular, the invention relates to the implementation of an Inverse Discrete Cosine Transform.

BACKGROUND OF THE INVENTION

The first implementation of Discrete Cosine Transform (DCT) and Inverse Discrete Cosine Transform (IDCT) was introduced by N. Ahmed, T. Natarajan and K. R. Rao (N. Ahmed, T. Natarajan, and K. R. Rao; Discrete Cosine Transform; *IEEE Transactions on Computers*, 90–93, 1974). The algorithm introduced by the Ahmed reference requires a large number of calculations to achieve an accurate result. This first implementation was advanced by the DCT and IDCT algorithm generated by W. Chen, C. H. Smith and S. C. Fralick (W. Chen, C. H. Smith, and S. C. Fralick; A Fast Computational Algorithm for the Discrete Cosine Transform; *IEEE Transactions on Communications*, COM-25(9): 1004–1009, 1977). The Chen algorithm improved upon the Ahmed algorithm but still requires numerous calculations.

More and more microprocessors now provide instructions and associated hardware to accelerate the execution of multimedia applications. The multimedia extensions implemented in such microprocessors can be based on Single Instruction Multiple Data (SIMD) mode of computing. Hitachi has produced such a microprocessor labeled the SH5. The SH5 utilizes the SIMD mode which allows the SH5 to simultaneously compute the same instructions on up to four different data values.

The two-dimensional, 8×8 IDCT is a commonly used function in various video decompression applications. Some multimedia standards, like MPEG-2, require a certain level of IDCT accuracy as enunciated in the IEEE 1180 compliance test (IEEE Standard Specifications for the Implementation of 8×8 Inverse Discrete Cosine Transform, IEEE Std. 1180-1990). The brute-force IDCT solution for and 8×8 matrix, as is well known in the art, requires 4096 multiplications and 3584 additions.

For a given 2D DCT sequence $[X(m,n), 0 \leq m,n \leq N-1]$, the 2D IDCT sequence $[x(i,j), 0 \leq i,j \leq N-1]$ is determined as:

$$x(i,j) = \sqrt{\frac{4}{N^2}} \sum_{m=0}^{N-1}\sum_{n=0}^{N-1} c(m)c(n)X(m,n)\cos\left\{\frac{(2i+1)m\pi}{2N}\right\}\cos\left\{\frac{(2j+1)n\pi}{2N}\right\}$$

$$\text{where } c(k) = \begin{cases} \frac{1}{\sqrt{2}} & \text{form} = 0 \\ 1 & \text{otherwise} \end{cases}$$

Generally the separability property of IDCT can be exploited while computing 2D IDCT by performing 1D IDCT on the input matrix in one direction (for example, by row) and then doing another 1D IDCT on the output of the first in an opposite direction (by column). For a given DCT sequence $[X(k), 0 \leq k \leq N-1]$, the 1D IDCT sequence $[x(n), 0 \leq n \leq N-1]$ is defined as $$x(n) = \sum_{k=0}^{N-1} X(k)\cos\left\{\frac{(2n+1)k\pi}{2N}\right\}$$

where the multiplying constant has been neglected and X(0) has been manipulated. Thus, for N=8, this can be viewed as an 8×8 matrix times an 8×1 vector.

In Chen's algorithms, Chen assumes floating-point (referred to as real in the Chen reference) datatypes and further, does not discuss the implementation of the algorithms nor the limitations of the algorithms resulting from implementation.

Chen's DCT algorithm involves only floating-point operations and is applicable for any N where N is a power of 2. The generalization consists of alternating sine/cosine butterfly matrices with binary matrices to reorder matrix elements in a form that preserves a recognizable bit-reversed pattern at every other node. The computational complexity of Chen's algorithm is $$\frac{3N}{2} \times \langle \log N - 1 \rangle + 2$$

floating-point additions and $$N\log N - \frac{3N}{2} + 4$$

floating-point multiplications for N inputs.

Chen's algorithm requires 16 multiplications and 26 additions per 1D 8×1 IDCT. This raw complexity, although much better than brute-force, is inferior compared to many other IDCT algorithms. A complexity estimate of a simple implementation of Chen's IDCT algorithm on a parallel processor or microprocessor, such as an SH5, is shown below. This implementation assumes the inputs to be 16-bits wide, and expands every intermediate product of the two 16-bit inputs to 32-bits in order to maintain an accuracy which will meet the IEEE 1180 standard.

Brute force non-optimized cycle count analysis:
In one direction:
Initialization (load constants, setup pointers): 20
Load inputs: 8
Shifting of inputs: 8

| | | |
|---|---|---|
| Stage 1: | Multiplication: | 16 |
| | Additions: | 8 |
| | Rounding Additions: | 8 |
| | Shifts: | 8 |
| | Conversion: | 4 |
| | Subtotal: | 44 |
| Stage 2: | Multiplications: | 2 + 2 + 4 + 4 = 12 |
| | Additions: | 1 + 1 + 2 + 2 + 1 + 1 + 1 + 1 = 10 |
| | Rounding Additions: | 2 + 2 + 2 + 2 = 8 |
| | Conversions: | 1 + 1 + 1 + 1 = 4 |
| | Subtotal: | 42 |

-continued

| Stage 3: | Multiplications: | 2 + 2 = 4 |
| --- | --- | --- |
| | Additions: | 1 + 1 + 1 + 1 + 1 + 1 = 6 |
| | Rounding Additions: | 2 + 2 = 4 |
| | Shifts: | 2 + 2 = 4 |
| | Conversions: | 1 + 1 = 2 |
| | Subtotal: | 20 |
| Stage 4: | Additions: | 8 |
| Total in one iteration: | | 130 |

Total in one direction: 130*2=260
Transpose: 32
Total in the other direction: 2*(44+42+20+8)=2*114=228
Transpose: 32
Clipping: 32
Store output: 16
Total cycle count for 2D (8×8) IDCT: 20+260+32+228+32+32+16=620 cycles There exists a number of algorithms that reduce the computational complexity of 8×8 IDCT. But the irregular memory access patterns of most of these algorithms do not make them conducive to efficient implementation. In addition, there is not an efficient and effective method for computing an IDCT which can meet the IEEE 1180 accuracy constraints. The Intel Corporation has published an implementation of IDCT using MMX instructions in an application note (Using MMX Instructions in a Fast IDCT Algorithm for MPEG Decoding; Application Note, http://developer.intel.com/drg/mmx/appnotes/ap528.htm). But this implementation is not compliant with the IEEE 1180 standard.

SUMMARY

The present invention provides an apparatus and method for performing an inverse discrete cosine transform (IDCT) in the decompression of compressed data such as compressed video or audio data. Performing the IDCT of the present invention includes performing a first one directional (1D) IDCT resulting in a plurality of first 1D IDCT coefficients followed by a second 1D IDCT resulting in a plurality of second 1D IDCT coefficients. In performing the first 1D IDCT and the second 1D IDCT a first plurality of intermediate butterfly computations are performed. Following the second 1D IDCT a rounding and shifting of the plurality of second 1D IDCT coefficients is performed resulting in a plurality of output coefficients.

Performing the first plurality of intermediate butterfly computations further include performing a plurality of intermediate multiplications resulting in a plurality of initial products and performing a plurality of intermediate additions resulting in intermediate product which are maintained at no more than 16-bits.

Performing the first 1D IDCT and the second 1D IDCT futher include utilizing a round near positive (RNP) rounding scheme while the rounding and shifting of the plurality of second 1D IDCT coefficients further includes utilizing a round away from zero (RAZ) rounding scheme.

Performing the IDCT of the present invention further includes utilizing parallel processing to perform a single instruction on a plurality of coefficients simultaneously in parallel reducing the number of processor cycles needed to preform the IDCT.

The present invention performs the IDCT in less than 397 cycles while still complying with the IEEE 1180 standard.

BRIEF DESCRIPTION OF THE DRAWINGS

Additional advantages and features of the invention will become readily apparent upon reading the following detailed description and appended claims when taken in conjunction with reference to the drawings, in which:

DETAILED DESCRIPTION

In one embodiment, the present invention is designed to provide for the decompression of compressed signals, such as compressed video signals, audio signals and the like, through the implementation of an Inverse Discrete Cosine Transform (IDCT). The method and apparatus in one embodiment of the present invention is implemented through a microprocessor, computer or dedicated hardware which can provide instructions and associated hardware to accelerate the execution of multimedia applications. In one embodiment, the present invention takes advantage of the parallel processing capabilities of processors or microprocessors.

Figure 1:
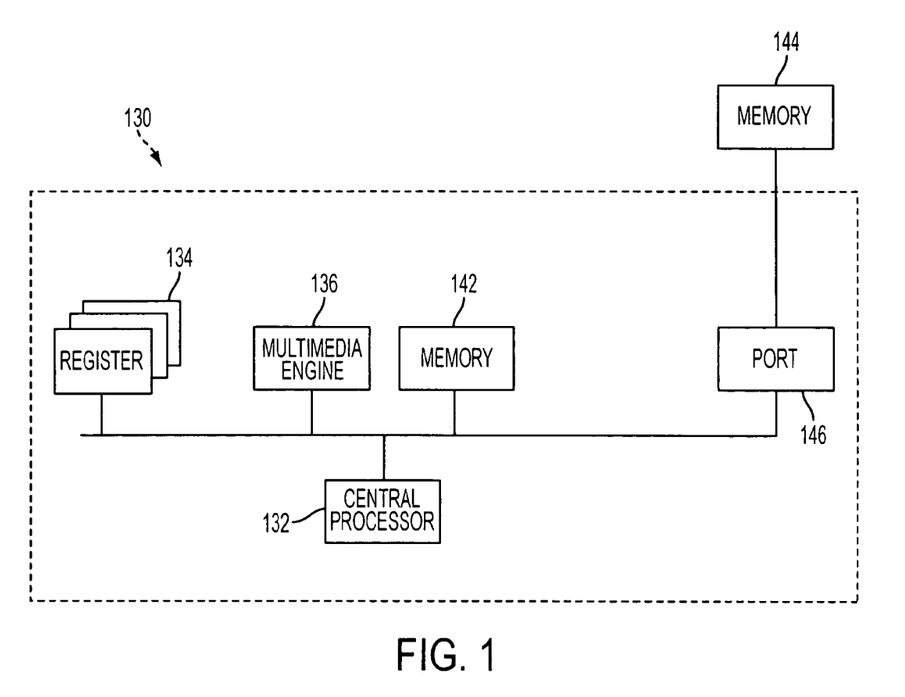
FIG. 1 is a schematic diagram of one embodiment of the present invention utilized to perform an inverse discrete cosine transform (IDCT.)

FIG. 1 depicts a block diagram of one embodiment of the present invention implemented on a processor or microprocessor 130. One example of a processor that can be used to implement the present invention includes the SH5 microprocessor produced by Hitachi America, Ltd., New York. In one embodiment of the present invention, processor 130 includes a central processor 132 which provides control and computational capabilities for processor 130. Central processor 132 is coupled to at least one register 134 and controls the input and output of information to registers 134. Central processor 132 is also coupled to a multimedia engine 136, internal memory 142 and further coupled to an external memory 144 through port 146. Multimedia engine 136 is based on Single Instruction Multiple Data (SIMD) mode of computing, which allows simultaneous computing or parallel processing of the same instructions on multiple different data values. For example, the 64-bit SH5 provides for the simultaneous computation of the same instructions on eight 8-bit data operations, four 16-bit data operations and two 32-bit data operations. Examples of the data operations that can be performed during parallel processing include, but are not limited to: addition, subtraction, multiplications, shifting, shuffling, parking, unparking and extraction. The SH5 is a general-purpose microprocessor with multimedia and floating-point support, designed for a high target clock speed of more than 400 MHz. The powerful SIMD multimedia engine consisting of four integer multipliers, and when pipelined, can perform four integer multiplications per cycle.

Figure 2:
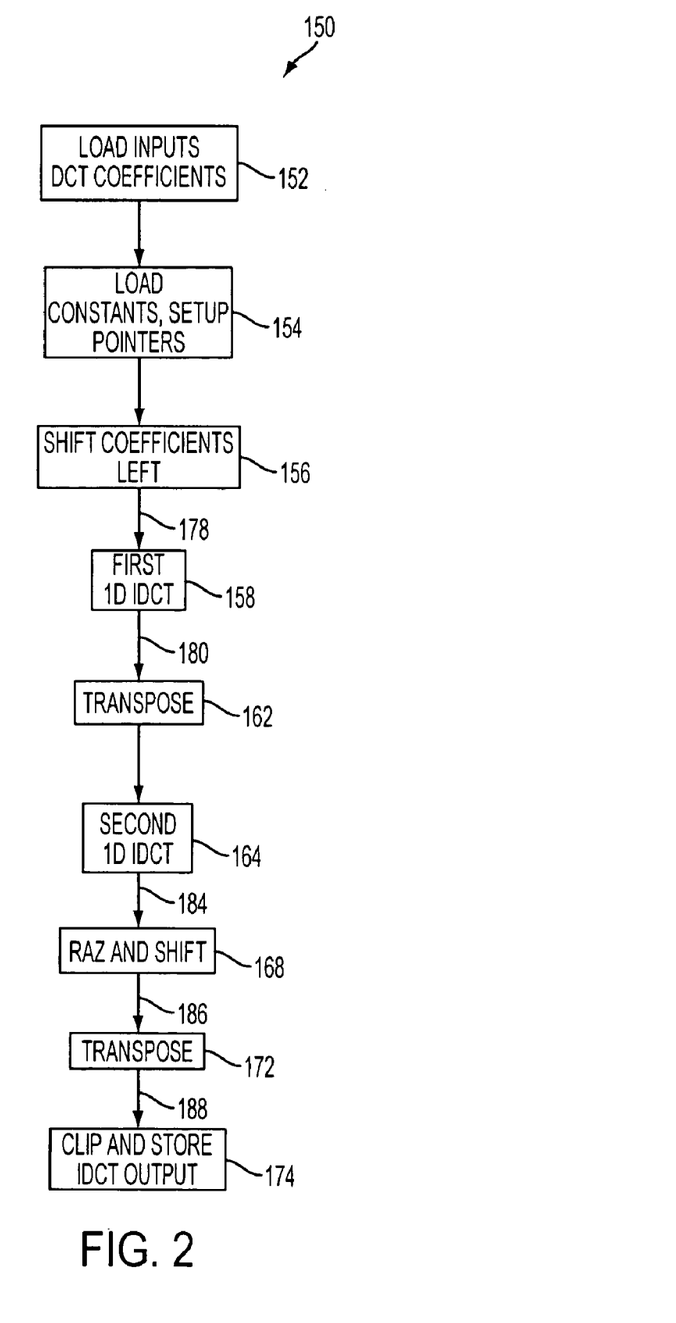
FIG. 2 is a flow diagram of the general method of the present invention for performing an IDCT.

FIG. 2 shows an overall flow diagram of one embodiment of the method of the present invention. In step 152, the input coefficients of a compressed signal or data are loaded into registers 134 of processor 130. Precalculated trigonometric constants and setup pointers are loaded in step 154. The trigonometric constants, in one embodiment, include precalculated sine and cosine values used within the IDCT calculations as is known in the art. The setup pointers are pointers to memory address locations for the inputs, outputs and coefficients. In step 156, the input coefficients are shifted left a predetermined number of bits to preserve the significant bits of the coefficients. In step 158, a first one directional (1D) IDCT is performed in one direction, for example vertically producing a first 1D IDCT matrix having first 1D IDCT coefficients 180. In step 162, the resulting first 1D IDCT coefficients 180 are transposed. In step 164, a second 1D IDCT is performed in the same direction as the first 1D IDCT, vertically, due to the transposing of the output of the first 1D IDCT. The second 1D IDCT results in a second 1D IDCT matrix, including second 1D IDCT final products or coefficients 184. Rounding Away from Zero (RAZ) (described in more detail below) and shifting is performed on the resulting second 1D IDCT final coefficients 184 in step 168 producing a rounded and shifted matrix of IDCT output coefficients 186. The rounded and shifted matrix of IDCT output coefficients 186 is then transposed in step 172 resulting in final IDCT output coefficients 188. In step 174, the final IDCT output coefficients 188 of the transposed matrix of the second 1D IDCT are clipped or saturated, such that the coefficients are saturated in the range [−256, 255] and stored.

Memory accesses are time consuming and often become a bottleneck in applications that deal with media rich datatypes. In prior art IDCT applications, significant numbers of coefficients and computational results are stored to memory and have to be recalled from memory. One feature of the present invention is the minimization of memory accesses when performing the IDCT. In one embodiment, the input coefficients are loaded in parallel into register 134 (FIG. 1), four at a time, using a single parallel processor instruction which performs 64-bit loading. Thus, four 16-bit coefficients are loaded in a single instructions and single cycle (step 152, FIG. 2). After the completion of the first 1D IDCT in step 158, unlike conventional implementations, the output matrix of first 1D IDCT coefficients 180 are not stored back into memory 142 or 144. Instead, these values are kept in registers 134 and the entire output matrix 180 is transposed in step 162 before the start of the second 1D IDCT in step 164. The final IDCT outputs coefficients 188 are stored to memory 142 or 144 in parallel, four at a time, using a signal processors instruction which performs a 64-bit parallel load-and-store operation.

In one embodiment the IDCT implementation of the present invention is configured for video decompression. Here the input coefficients are coefficients which are derived from any conventional means, including from pixel difference values as is known in the art. According to the IEEE 1180 standard, these IDCT inputs are assigned 12-bit integers in the range (−2048, 2047). The present invention loads the input coefficients as 16-bit entities in registers 134 which leaves at least 4 most significant zero bits. In order to preserve the more significant bits in subsequent intermediate computations the input coefficients are left shifted by 4 places. This extra 4-bit precision is carried through to the end of the IDCT at which point the extra 4 bits are nullified through a right shift or reverse shift after the second 1D IDCT 164, explained more fully below.

In one embodiment, the number of cycles needed to complete the IDCT of the present invention is further reduced by the use of the precalculated and stored trigonometric constant used in the intermediate multiplication, explained more fully below. The trigonometric constants are converted to integer constants by multiplying them by $2^{15}$ (a left shift of 15 places), thereby allowing a single instruction which performs an SIMD fixed point multiply along with a shift and round near positive (described more fully below) to be utilized. This single instruction operation allows parallel processing which provides for a more efficient method of performing IDCT and thus further reduces the number cycles needed to complete the IDCT.

Figure 3A:
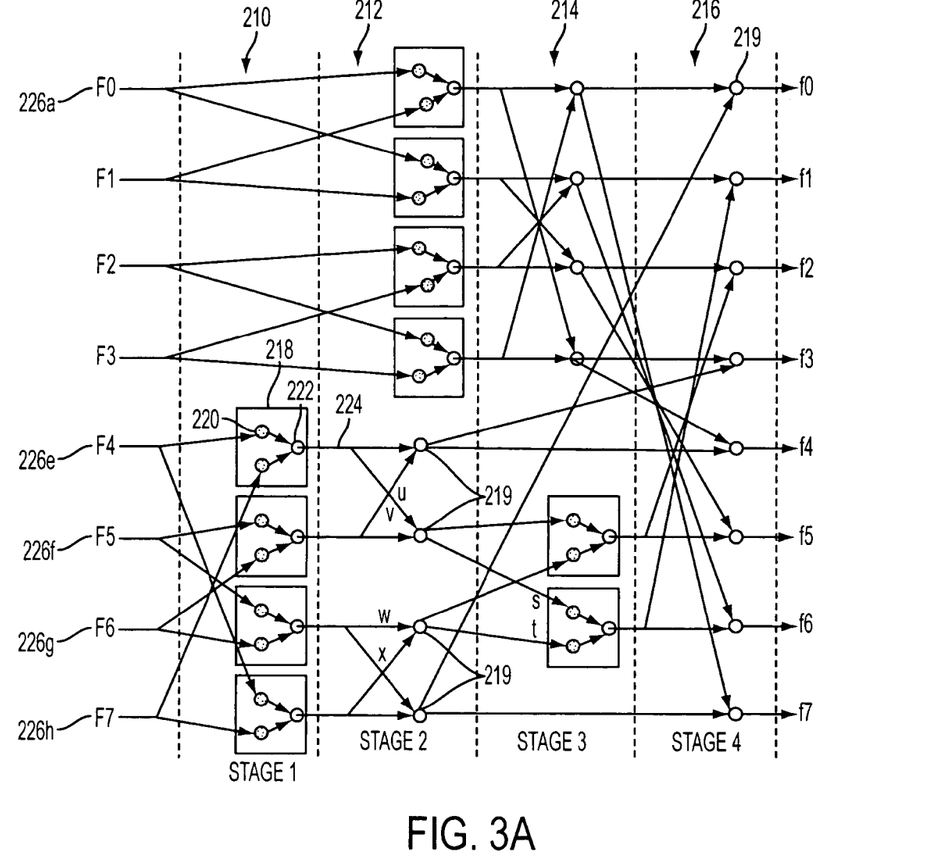
FIG. 3A is a schematic diagram depicting the four stages of a one directional IDCT in the method of performing the IDCT for the present invention.
Figure 3B:
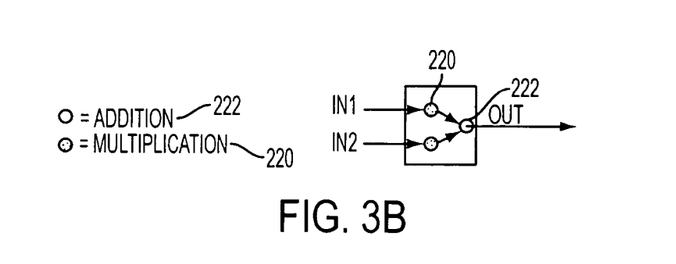
FIG. 3B is a schematic diagram depicting one intermediate butterfly computation utilized in the one directional IDCTs performed in the present invention.
Figure 4A:
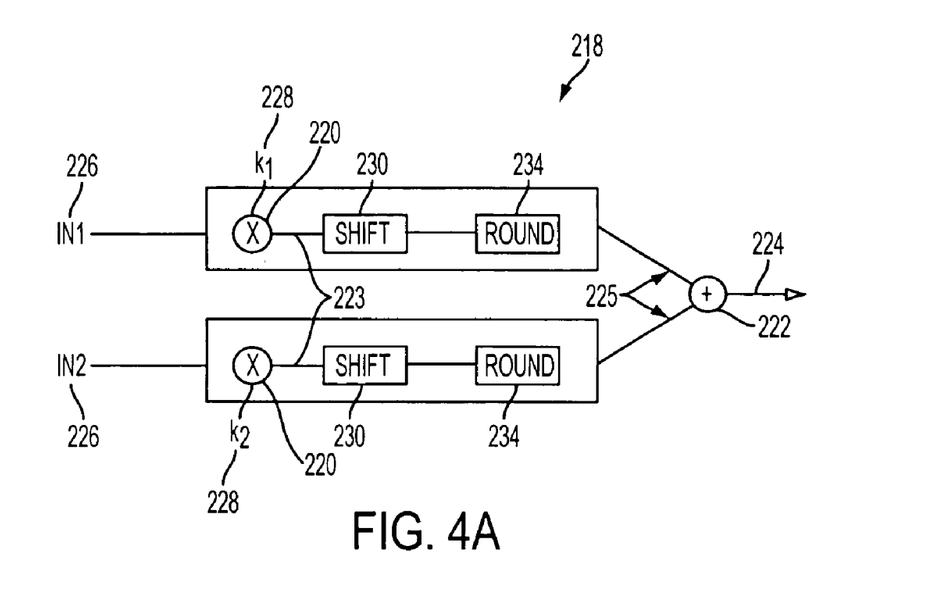
FIG. 4A is a more detailed schematic diagram of the intermediate butterfly computation as shown in FIG. 3B.

FIGS. 3a–b show a flow diagram of one embodiment of the present invention's implementation of the first and second 1D IDCT steps 158, 164 (see FIG. 2) for an 8×8 input coefficient matrix. The 1D IDCT is a 4-stage process, including stages 210, 212, 214 and 216. Each stage includes arithmetic computations including additions 219 and intermediate butterfly computations 218. Intermediate butterfly computations 218 include intermediate multiplications 220 and intermediate addition 222 producing intermediate products 224. FIG. 4a depicts one intermediate butterfly computation 218 including two intermediate multiplications 220, producing 32-bit initial product 223 and intermediate addition 222 producing intermediate product 224. Each intermediate multiplication 220 includes the multiplication of input 226 with precalculated trigonometric constants 228. Prior to intermediate addition 222, initial product 223 is maintained at no more than 16-bits. To maintain initial product 223 at no more than 16-bits, butterfly computation 218 further includes a shift right 230 and a rounding 234. 32-bit initial product 223 is shifted right 230 to maintain the 16-bit length allowing optimization of parallel processing and to maintain the most significant bits. The shifted initial product 231 is then rounded 234 to produce a 16-bit rounded initial product 225. The accuracy of the rounded initial product 225 is maintained because the initial 4-bit shift left of the input coefficients saves the most significant bits. Intermediate addition 222 then adds two 16-bit rounded initial products 225 to produce 16-bit intermediate product 224. When implemented on processor 130, for example the SH5, the intermediate butterfly computation 218 is performed utilizing a single instruction. Thus, the number of cycles needed to complete the IDCT is dramatically reduced. The SH5 can perform parallel processing allowing four intermediate butterfly computations to be performed at a single time, thus, further reducing the number of cycles needed to perform the IDCT. Because rounded initial product 225 is shifted and rounded to maintain a bit count of 16-bits, intermediate product 224 is also maintained at 16-bits and thus does not require shifting and rounding to maintain accuracy and compliance with the IEEE 1180 standard.

In one embodiment, shift right 230 is defined as a shift right by 15-bits of the fixed-point 32-bit initial product 223. Further, the rounding is performed through a simple round near positive (RNP), described in detail below. This 15-bit shift and RNP allows the multiplications 220, shift right 230 and rounding 234, to be performed by a single processor instruction 240, thus further reducing the total number of cycles needed to perform the IDCT and still maintaining compliance with the IEEE 1180 standard. Prior art implementations required the initial products 223 to be maintained at 32-bits in order to comply with the IEEE 1180 standard. Maintaining or expanding the products to 32-bits significantly limits the efficiency and reduces the advantages of parallel processing by a factor of at least two and thus increases the number of cycles needed to perform the IDCT. Further, prior art implementations required the use of a rounding away from zero (RAZ) rounding scheme, a more complex rounding method requiring a greater number of computations, to maintain a sufficient degree of accuracy to meet the IEEE 1180 standard. By maintaining the rounded initial products 225 and thus intermediate products 224 at 16-bits, the present invention optimizes parallel processing and enables processor 130 to continue with four simultaneous computations throughout the IDCT process.

Figure 5:
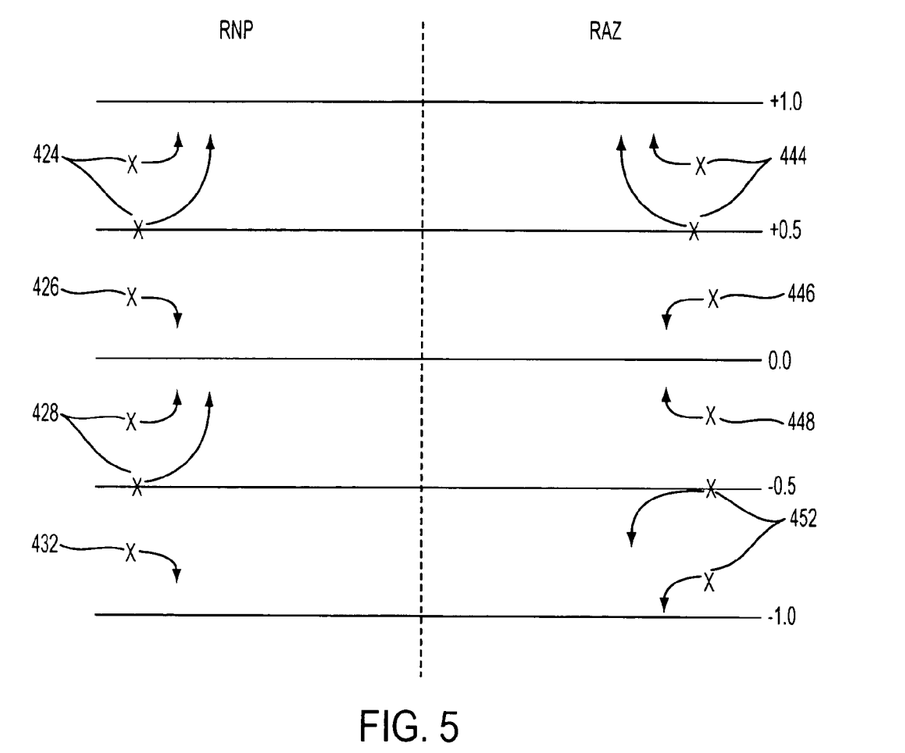
FIG. 5 is a graphical representation of the two distinct rounding schemes utilized in the IDCT method of FIG. 2.

FIG. 5 depicts the two rounding schemes implemented in one embodiment of the present invention. The left column depicts the RNP rounding scheme while the right column depicts the RAZ scheme. In a RNP scheme, if the number 424 to be rounded is equal to or greater than 0.5 above a positive whole number, the RNP rounds number 424 up. If number 426 is less than 0.5, then RNP rounds number 426 down. If number 428 is greater than or equal to 0.5 above a negative whole number, then RNP rounds number 428 up. If number 432 is less than 0.5 below a negative whole number, then RNP rounds number 432 down.

Still referring to FIG. 5, in a RAZ rounding scheme, if a number 444 to be rounded is equal to or greater than 0.5 above a positive whole number, the RNP rounds number 444 up. If number 446 is less than 0.5, then RNP rounds number 446 down. If number 448 is greater than 0.5 above a negative whole number, then RNP rounds number 448 up. If number 452 is less than or equal to 0.5 below a negative number, then RNP rounds number 452 down.

RAZ or symmetric rounding may not be directly supported by processors 130 which can be used to implement the present invention. For example, RAZ is not directly supported by SH5. Therefore, in one embodiment, the present invention avoids this more complex rounding mode until the end of the IDCT. The use of RAZ only during the final round and shift of the 16-bit second 1D IDCT final coefficients 184 generated by the fourth stage 216 of the second 1D IDCT in step 164 allows the present invention to comply with the IEEE 1180 standard.

Figure 4B:
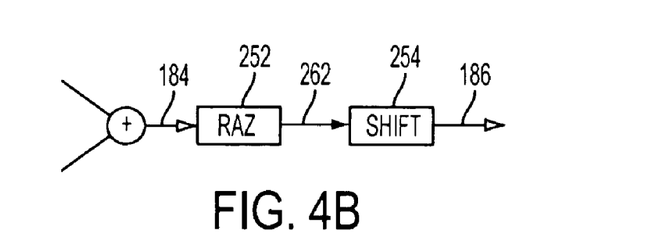
FIG. 4B is a schematic diagram of a rounding and shifting scheme performed following the second 1D IDCT of FIG. 2.

Referring to FIG. 4B, in one embodiment, following the fourth stage 216 of the second 1D IDCT 164 a round and shift is performed on second 1D IDCT final coefficients 184 to ensure compliance with the IEEE 1180 standard and to maintain the coefficients at no more than 16-bits thus optimizing the parallel processing. Rounding 252 is implemented through the rounding away from zero (RAZ) rounding scheme. In one embodiment of the present invention, RAZ rounding 252 is implemented through an arithmetic compensation, followed by the final shift 254 to obtain the IDCT output coefficients 186 which comply with the IEEE 1180 standard.

Figure 4C:
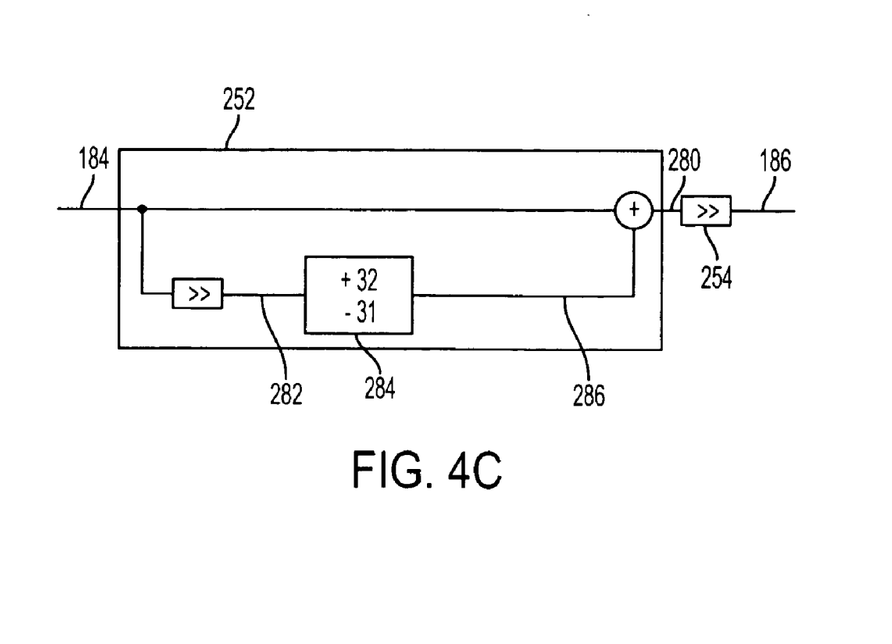
FIG. 4C is a more detailed schematic diagram of the rounding and shifting scheme of FIG. 4B including the rounding away from zero (RAZ) rounding scheme.

Referring to FIG. 4C, in one embodiment RAZ 252 includes an arithmetic compensation resulting in a compensated final product 280 which is the shifted right a plurality of bits by the final shift 254. RAZ 252 initially shifts second 1D IDCT final coefficients 184 right 15-bits resulting in shifted final coefficient 282. Shifted final coefficients 282 are than adjusted by a conditional constant 284 by adding shifted final coefficients 282 with conditional constant 284 producing a conditional product 286. Second 1D IDCT final coefficient 184 is then added with conditional product 286 producing compensated final product 280. The precalculated conditional constant is derived to be 32 and 31 for positive and negative second 1D IDCT final coefficient 184 respectively. The final shifted right 254 is a right shift of 6-bits to nullify the initial 4-bit left shift of the original 12-bit input coefficients, along with a 2-bit right shift as dictated by the IDCT algorithm to obtain IDCT output coefficients 186.

Figure 6:
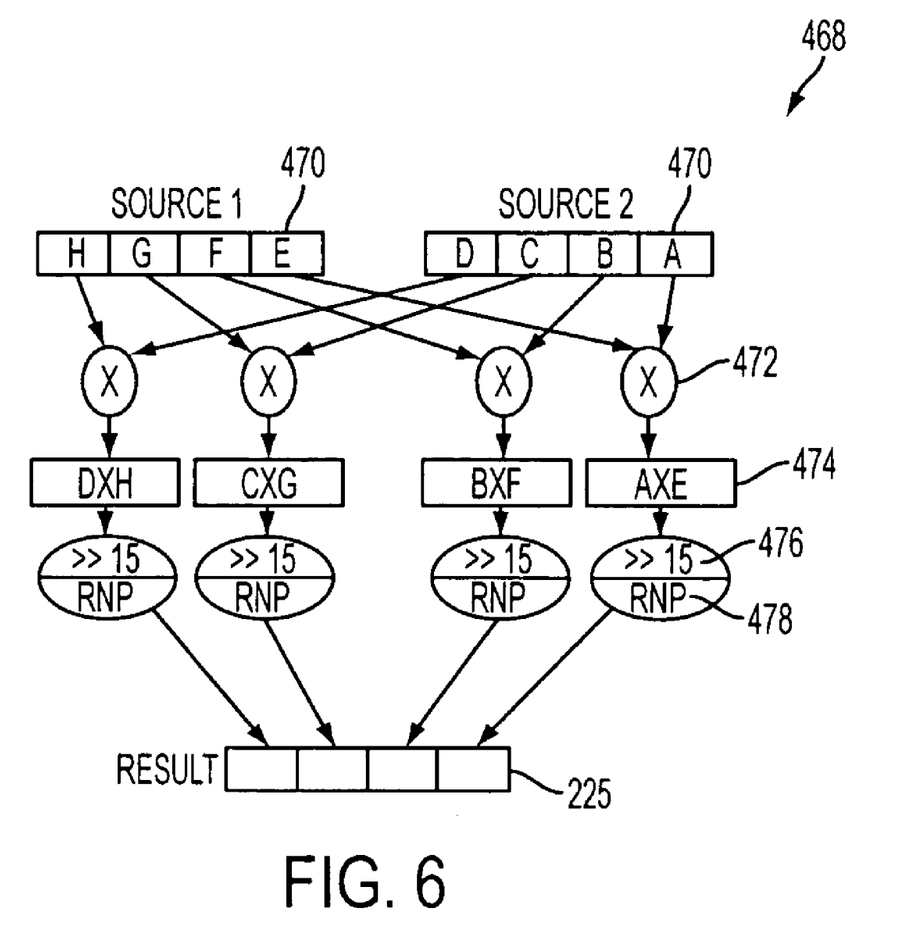
FIG. 6 is a flow diagram of the intermediate butterfly computation of FIG. 4A implemented in a single processor instruction.

FIG. 6 depicts one embodiment of the SIMD fixed point multiply with shift and RNP single instruction 468. The single instruction 468 is one implementation of the intermediate multiplication 220, shift 230 and round 234 of the intermediate butterfly computation 218 shown in FIG. 4a. The single instruction 468 performs the intermediate butterfly computation 218 in a single instruction thus reducing the number of cycles need to perform the IDCT of the present invention. Initially, four input coefficients 470a–d are multiplied 472 by trigonometric constants 470e–h. The initial products 474 of the multiplications 472 are then shifted 476 to the right by 15-bits and rounded 478 utilizing a RNP rounding scheme producing 16-bit rounded initial products 225 of the intermediate butterfly computation 218. The single instruction 468 is performed through parallel processing, thus allowing four intermediate butterfly computations 218 to be performed simultaneously, further reducing the number of cycles need to perform the IDCT.

Referring back to FIGS. 3 and 4, 32-bit initial products 223 of intermediate multiplications 220 are maintained at 16-bits wide which is the same width as the width of the two input coefficients 226 to the multiplication 220. Unlike other conventional implementations, the present invention does not use any shift and round operations with intermediate additions 222 and this does not jeopardize the IEEE 1180 compliance. The 16-bit widths of multiplication products are maintained through shifting 230 which also maintains the most significant bits. Because of the initial left shift by 4-bits of the original 12-bit input coefficients and the use of the shift right 230, the most significant bits are maintained and thus simple RNP does not affect the accuracy of the intermediate results. Therefore, the IEEE 1180 standard is still met. Further, maintaining intermediate products 224 at 16-bits provides the ability to continue to optimize the use of parallel processing by a factor of at least two over prior art implementations which requires expanding the intermediate products to 32-bits.

The implementation of IDCT in the present invention is indirect in nature. Instead of directly computing a two-directional (2D) IDCT the present invention performs a first 1D IDCT in step 158 in one direction followed by a second 1D IDCT in step 164 in the same direction on the transposed output of the first 1D IDCT. The indirect approach is computationally superior to the direct approach. But a drawback of the indirect approach is that the data matrix has to be effectively transposed (step 162) before the second 1D IDCT is performed in step 164. This can be done by appropriately storing the first 1D IDCT output coefficients 180 into memory 142 or 144 and loading them as inputs to the second 1D IDCT. But, this requires a large number of memory accesses (cycles), for example, 80 memory accesses (cycles) are required when performed in the SH5. Instead, in one embodiment the present invention stores the first 1D IDCT output matrix 180 in registers 134 and uses shuffle instructions to transpose the 8×8 matrix in step 162 which are then provided as inputs to step 164 for the second 1D IDCT. This technique of in-register matrix transpose with shuffle instructions performed through any conventional manner, including those techniques well known in the art, take fewer instructions than the memory accesses. For example, the SH5 requires 32 instructions (cycles) to perform the transpose with the shuffle instructions.

A complexity estimate of one implementation of the present invention implemented on an SH5 is shown below.

Cycle Count Analysis:

| | |
|---|---:|
| Load trigonometric and other constants, setup pointers: | 20 |
| Phase 1 (158) of 1st 1D IDCT: | |
| Load input coefficients (152) | 8 |
| Left shift inputs (156): | 8 |
| Stage 1 (210) computations: | 12 |
| Stage 2 (212) computations: | 14 |
| Stage 3 (214) computations: | 8 |
| Stage 4 (216) computations: | 8 |
| Subtotal: | 58 |
| Phase 2 of 1st ID IDCT: | 58 |
| Transpose matrix (162): | 32 |
| Phase 1 of 2nd 1D IDCT (164): | |
| Stage 1 (210) computations: | 12 |
| Stage 2 (212) computations: | 14 |
| Stage 3 (214) computations: | 8 |
| Stage 4 (216) computations: | 8 |
| Shift and RAZ (168): | 32 |
| Subtotal: | 74 |
| Phase 2 of 2nd 1D IDCT: | 74 |
| Transpose matrix (172): | 32 |
| Clipping (174): | 32 |
| Store outputs to memory (174): | 16 |
| Total (20 + 58 + 58 + 32 + 74 + 74 + 32 + 32 + 16): | 396 |

Compared to the non-optimized cycle count of 620 cycles (as described in the Background), the implementation of the present invention provides:

$$\frac{620-396}{620} \times 100 = 36 \text{ percent improvement in performance.}$$

This invention can be used, for example, as part of software video codecs (based on H.263, MPEG-1, MPEG-2 and MPEG-4 standards) and consumer electronics products (like digital T.V., DVD, settop box, gateway devices) that use programmable microprocessors with SIMD multimedia extensions.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for performing an inverse discrete cosine transform (IDCT) on a plurality of input coefficients, the method for performing the IDCT comprising:
    loading the plurality of input coefficients into at least one register;
    shifting the input coefficients left a plurality of bits;
    performing a first one directional (1D) IDCT on the plurality of input coefficients resulting in a plurality of first 1D IDCT coefficients;
    performing a second 1D IDCT resulting in a plurality of second 1D IDCT coefficients;
    performing the first 1D IDCT and the second 1D IDCT including performing a first plurality of intermediate butterfly computations; and
    rounding and shifting the plurality of second 1D IDCT coefficients resulting in a plurality of output coefficients.

2. The method for performing the IDCT on the plurality of input coefficients as claimed in claim 1, wherein:
    the step of performing the first plurality of intermediate butterfly computations including:
        performing a plurality of intermediate multiplications resulting in a plurality of initial products; and
        performing a plurality of intermediate additions.

3. The method for performing the IDCT on the plurality of input coefficients as claimed in claim 2, wherein:
    the step of performing a plurality of intermediate multiplications including:
        multiplying input coefficients by a trigonometric constant producing an initial product; and
        maintaining the initial product at no more than 16-bits.

4. The method for performing the IDCT on the plurality of input coefficients as claimed in claim 3, wherein:
    the step of maintaining the initial product at no more than 16-bits including shifting the initial product right a plurality of bits resulting in a shifted initial product; and
    rounding the shifted initial product utilizing a round near positive (RNP) rounding scheme.

5. The method for performing the IDCT on the plurality of input coefficients as claimed in claim 4, wherein:
    the step of performing the first plurality of intermediate butterfly computations of the first 1D IDCT and the second 1D IDCT including performing a second plurality of intermediate butterfly computations simultaneously in parallel.

6. The method for performing the IDCT on the plurality of input coefficients as claimed in claim 4, wherein:
    the step of performing the intermediate butterfly computation of the first 1D IDCT and the second 1D IDCT including performing each intermediate butterfly computation in a single instruction.

7. The method for performing the IDCT on the plurality of input coefficients as claimed in claim 3, wherein:
    the step of maintaining the initial product at no more than 16-bits including rounding the initial product utilizing a round near positive (RNP) rounding scheme.

8. The method for performing the IDCT on the plurality of input coefficients as claimed in claim 1 wherein:
    performing the first and second 1D IDCT including rounding utilizing a RNP rounding scheme and not utilizing a rounding away from zero (RAZ) rounding scheme.

9. The method for performing the IDCT on the plurality of input coefficients as claimed in claim 8, wherein:
    the step of rounding and shifting including rounding utilizing a RAZ rounding scheme.

10. The method for performing the IDCT on the plurality of input coefficients as claimed in claim 1, wherein:
    the step of performing the intermediate butterfly computation of the first 1D IDCT and the second 1D IDCT including performing each intermediate butterfly computation in a single instruction.

11. The method for performing the IDCT on the plurality of input coefficients as claimed in claim 10, wherein:
    the step of performing the first plurality of intermediate butterfly computations of the first 1D IDCT and the second 1D IDCT including performing a second plurality of intermediate butterfly computations simultaneously in parallel.

12. The method for performing the IDCT on the plurality of input coefficients as claimed in claim 1, wherein:
the step of performing the first plurality of intermediate butterfly computations including performing each intermediate butterfly computation in a single instruction.

13. The method for performing the IDCT on the plurality of input coefficients as claimed in claim 12, wherein:
the step of performing the first plurality of intermediate butterfly computations including performing a second plurality of intermediate butterfly computations simultaneously in parallel.

14. The method for performing the IDCT on the plurality of input coefficients as claimed in claim 13, wherein:
the step of performing a second plurality of intermediate butterfly computations simultaneously in parallel including performing at least four intermediate butterfly computations simultaneously in parallel.

15. The method for performing the IDCT on the plurality of input coefficients as claimed in claim 1, wherein:
the step of shifting the input coefficients left a plurality of bits including shifting the input coefficients left at least 4-bits.

16. The method for performing the IDCT on the plurality of input coefficients as claimed in claim 1, further comprising:
loading the input coefficients into at least one register including loading a plurality of the input coefficients simultaneously in parallel and shifting the input coefficients left a plurality of bits prior to the step of performing the first 1D IDCT.

17. The method for performing the IDCT on the plurality of input coefficients as claimed in claim 16, wherein:
the step of loading a plurality of coefficients simultaneously in parallel including loading at least four coefficients simultaneously in parallel.

18. The method for performing the IDCT on the plurality of input coefficients as claimed in claim 1, wherein:
the step of shifting the input coefficients left including shifting a plurality of the input coefficients left simultaneously in parallel.

19. The method for performing the IDCT on the plurality of input coefficients as claimed in claim 18, wherein:
the step of shifting a plurality of the coefficients left simultaneously including shifting at least four coefficients simultaneously in parallel.

20. A method for performing an inverse discrete cosine transform (IDCT) on a plurality of input coefficients, the method for performing the IDCT comprising:
loading the plurality of input coefficients into at least one register;
shifting the input coefficients left a plurality of bits;
performing a first one directional (1D) IDCT on the plurality of input coefficients resulting in a plurality of first 1D IDCT coefficients including utilizing a round-near-positive (RNP) rounding scheme;
performing a second 1D IDCT resulting in a plurality of second 1D IDCT coefficients including utilizing a round-near-positive (RNP) rounding scheme; and
rounding and shifting the plurality of second 1D IDCT coefficients resulting in a plurality of output coefficients including rounding utilizing a round away from zero (RAZ) rounding scheme.

21. The method for performing the IDCT as claimed in claim 20, wherein:
the step of rounding and shifting including rounding utilizing the RAZ rounding scheme including:
shifting the second 1D IDCT final coefficient right a plurality of bits resulting in a shifted final coefficient;
adding a conditional constant with the shifted final coefficient resulting in a conditional product;
adding the second 1D IDCT final coefficient with the conditional product resulting in a compensated final product; and
shifting the compensated final product right a plurality of bits.

22. The method for performing the IDCT as claimed in claim 21, wherein:
the step of shifting the second 1D IDCT final coefficient including shifting the second 1D IDCT final coefficient right at least 15 bits.

23. The method for performing the IDCT as claimed in claim 21, wherein:
the step of adding the conditional constant including:
adding 32 if the second 1D IDCT final coefficient is positive; and
adding 31 if the second 1D IDCT final coefficient is negative.

24. The method for performing the IDCT as claimed in claim 21, wherein:
the step of shifting the compensated final product left including shifting the compensated final product right at least 6-bits.

25. The method for performing the IDCT as claimed in claim 21, wherein:
the step of rounding and shifting including performing the step of rounding and shifting in four instructions.

26. The method for performing the IDCT as claimed in claim 25, wherein:
performing a plurality of the steps of rounding and shifting simultaneously in parallel.

27. The method for performing the IDCT as claimed in claim 20, wherein:
the step of rounding and shifting including performing at least four of the steps of rounding and shifting simultaneously in parallel.

28. The method for performing the IDCT as claimed in claim 20, further comprising:
transposing the first 1D IDCT coefficients prior to performing the second 1D IDCT; and
transposing the IDCT output coefficients resulting in final IDCT outputs coefficients.

29. The method for performing the IDCT as claimed in claim 28, further comprising:
the step of transposing the first 1D IDCT coefficients and the IDCT output coefficients including implementing a shuffle a instruction.

30. The method for performing the IDCT as claimed in claim 28, further comprising:
clipping the final IDCT outputs coefficients.

31. A method for decompressing compressed data having a plurality of input coefficients, comprising:
loading the plurality of input coefficients into at least one register;
shifting the input coefficients left a plurality of bits;

performing a first one directional (1D) IDCT and a second 1D IDCT on the plurality of input coefficients resulting in output coefficients including:
utilizing a round near positive (RNP) rounding scheme;
not utilizing a round away from zero (RAZ) rounding scheme; and
rounding and shifting the output coefficients including utilizing the RAZ rounding scheme.

32. The method for decompressing compressed data as claimed in claim 31, wherein:
the IDCT is performed in less than 397 cycles.

33. The method for decompressing compressed data as claimed in claim 32, wherein:
complying with an Institute of Electrical and Electronics Engineers (IEEE) 1180 accuracy standard.

34. The method for decompressing compressed data as claimed in claim 33, wherein:
implementing the IDCT utilizing single instruction multiple data instructions (SIMD).

35. The method for decompressing compressed data as claimed in claim 34, wherein:
performing at least four SIMD instructions simultaneously in parallel.

36. The method for decompressing compressed data as claimed in claim 31, wherein:
performing the first 1D IDCT and the second 1D IDCT such that four coefficients are operated on simultaneously in parallel.

37. An apparatus for decompressing a compressed data signal, comprising:
a means for loading a plurality of input coefficients into at least one register;
a means for shifting the input coefficients a plurality of bits coupled with the register configured to receive the input coefficients and produce shifted input coefficients:
a means for performing a first one directional (1D) Inverse Discrete Cosine Transform (IDCT) coupled with the means for shifting the input coefficients configured to receive the shifted coefficients and produce a first 1D IDCT output matrix:
a means for transposing the first 1D IDCT output matrix coupled with the means for performing the first IDCT configured to transpose the first 1D IDCT output matrix and to produce a first transposed IDCT output matrix;
a means for performing a second 1D IDCT on the transposed IDCT output matrix coupled with the means for transposing the first IDCT output matrix configured to receive the transposed first IDCT output matrix and to produce a second IDCT output matrix;
a means for rounding away from zero (RAZ) and shifting coupled with the means for performing the second 1D IDCT configured to round and shift coefficients of the second 1D IDCT output matrix to produce rounded second 1D IDCT output matrix;
a means for transposing the rounded second 1D IDCT output matrix coupled with the means for RAZ and shifting configured to transpose the rounded second 1D IDCT output matrix to produce a decompressed output;
a microprocessor including parallel processing, multimedia applications, at least one register, the means for loading a plurality of input coefficients, the means for shifting the input coefficients, the means for performing a first 1D IDCT, the means for transposing the first 1D IDCT, the means for performing the second 1D IDCT, the means for RAZ and shifting, the means for transposing the rounded second 1D IDCT output matrix; and
the microprocessor configured to perform at least one single instruction multiple data (SIMD) instruction on a plurality of coefficients simultaneously in parallel.

38. A computer program product for providing the decompression of a compressed signal, the computer program product including a computer readable storage medium an a computer program mechanism embedded therein, the computer program mechanism comprising:
a method of performing an Inverse Discrete Cosine Transform (IDCT) comprising:
loading a plurality of input coefficients into at least one register;
shifting the input coefficients left a plurality of bits;
performing a first one directional (1D) Inverse Discrete Cosine Transform (IDCT) including utilizing a round near positive (RNP) rounding scheme producing a first IDCT output matrix;
transposing the first IDCT output matrix producing a transposed IDCT output matrix;
performing a second 1D IDCT on the transposed IDCT output matrix including utilizing a RNP rounding scheme producing a second IDCT output matrix including a plurality of components;
rounding away from zero and shifting each of the components of the second IDCT output matrix producing a rounded IDCT output matrix; and
transposing the rounded IDCT output matrix producing a decompressed output.

39. A method for decompressing a compressed signal, comprising:
receiving the compressed signal comprising a plurality of input coefficients; and
performing an Inverse Discrete Cosine Transform (IDCT) comprising:
loading a plurality of input coefficients into at least one register;
shifting the input coefficients left a plurality of bits;
performing a first one directional (1D) Inverse Discrete Cosine Transform (IDCT) including utilizing a round near positive (RNP) rounding scheme producing a first IDCT output matrix;
transposing the first IDCT output matrix producing a transposed IDCT output matrix;
performing a second 1D IDCT on the transposed IDCT output matrix including utilizing a RNP rounding scheme producing a second IDCT output matrix including a plurality of components;
rounding away from zero and shifting each of the components of the second IDCT output matrix producing a rounded IDCT output matrix; and
transposing the rounded IDCT output matrix producing a decompressed output signal.

* * * * *